J. H. RIVIÈRE.
NUT LOCK.
APPLICATION FILED JUNE 22, 1911.
1,067,551.
Patented July 15, 1913.
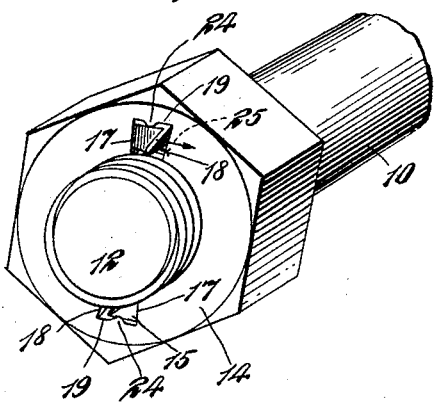
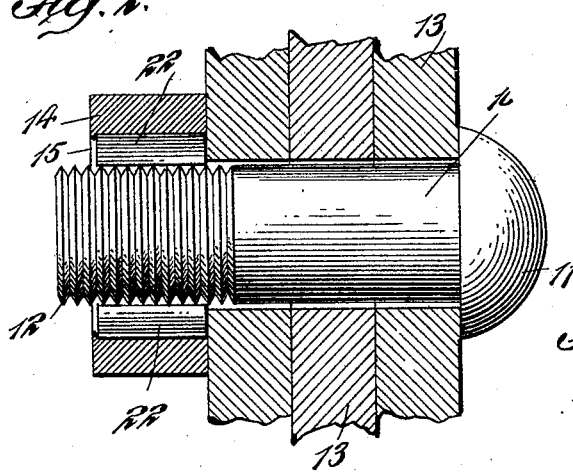
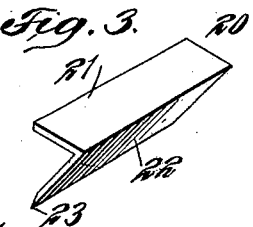
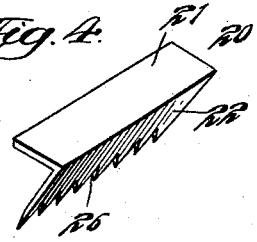
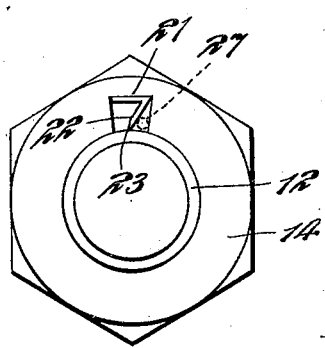
Witnesses:
Inventor
J. Henri Rivière
By his Attorneys

UNITED STATES PATENT OFFICE.

JEAN HENRI RIVIÈRE, OF WEST HOBOKEN, NEW JERSEY.

NUT-LOCK.

1,067,551.  Specification of Letters Patent.  Patented July 15, 1913.

Application filed June 22, 1911. Serial No. 634,820.

*To all whom it may concern:*

Be it known that I, JEAN HENRI RIVIÈRE, a citizen of the United States, and a resident of West Hoboken, county of Hudson, State of New Jersey, have invented certain new and useful Improvements in Nut-Locks, of which the following is a full, clear, and exact description.

This invention relates more particularly to means held within a nut which is adapted to engage the threads of the bolt in such a way as to permit movement of the nut in one direction but which will positively hold and lock the nut against movement on the bolt in the opposite direction.

One of the principal objects of the invention is to provide a simple and efficient nut-lock in which the locking means is so arranged and constructed that it will not materially increase the cost of manufacture of the nut, and is of such a form that it will permit the nut to be readily and easily threaded on the bolt and rotated in one direction, but which means will positively grip and hold the nut against movement to release the same either by vibration or by positive means, thereby overcoming many of the objections incident to devices of this character as ordinarily constructed.

Another object of the invention is to provide a device of the character described in which the locking means may be made of spring steel or like material which is adapted to cut into a part of the bolt when the nut has a tendency to move in a releasing direction.

A further object of the invention is to provide a nut in which the opening or openings for the reception of the locking means may be formed at the same time that the opening for the thread of the nut is formed, so that the cost of manufacture will be little if anything more than the nut as ordinarily made, and to provide simple locking means which may be readily applied and held to the nut.

A still further object of the invention is to provide a simple and efficient nut-lock in which one or more locking elements may be used and which element or elements may be readily made from sheet metal and so formed that it may be caused to positively grip the bolt, or which may be positively released when it is desired to remove the nut from the bolt.

With these and other objects in view, the invention will be hereinafter more particularly described, with reference to the accompanying drawings, which form a part of this specification, and will then be pointed out in the claim at the end of the description.

In the drawings, Figure 1 is a perspective view of one form of device embodying my invention. Fig. 2 is a longitudinal section, partly in elevation, showing how the locking means is arranged within the nut. Fig. 3 is a detail perspective view of one of the locking devices or elements. Fig. 4 is a detail perspective view of a slightly different form of locking element; and Fig. 5 is an end elevation showing how a single locking element may be employed instead of two or more.

The bolt 10 may be of any suitable construction and may have a head 11 at one end of the body, and a threaded portion 12 at the other end thereof, and said bolt may be passed through a plurality of parts 13 which are adapted to be fastened together by said bolt. A nut 14 of any suitable form whether square or hexagonal has the usual threaded opening adapted to fit over the threaded end 12 of the bolt so as to be held thereto, and which nut is adapted to clamp the parts 13 between the head 11 and the said nut 14, all of which may be of the usual or of any preferred construction.

To prevent the nut from being rotated in a direction which will remove the same from the bolt and still permit the nut to be readily fastened or placed on the bolt, various means may be employed. As shown the nut has two openings or slots 15, though the number of these slots may vary, and each slot may be dove-tailed and made to extend lengthwise of the bolt. Each slot has three sides 17, 18 and 19, the sides 17 and 18 converging toward each other in the direction of the threaded opening so that the distance between the sides at said opening is less than at the upper side 19, and located in each slot is a locking element 20. The element 20 is substantially V-shaped in form and has one side 21 adapted to rest against the side 19 of the slot and a locking side 22 the lower edge of which may be sharpened, as at 23, to adapt the same to engage and grip the threads of the bolt by entering the same in a manner to be presently described. The locking element may be of sheet steel and has a length corresponding substantially to that of the thickness of the nut, and said element or elements if more than one are used, may be held in place within the nut by forcing a part of the nut inward, as for example by a hammer, so that it will overlap the outer edge of the locking element, as at 24, Fig. 1, and at either one or both faces of the nut. The side 21 of the locking element rests against the side 19 of the slot 15 between the sides 17 and 18, and the angular portion or side 22 thereof extends normally over to substantially midway between the said sides 17 and 18 or to any other desired point.

It will be seen that when the nut is rotated to clamp the parts 13, the side 22 of the locking device will yield thereby permitting the nut to be readily rotated, but if an attempt is made to rotate the nut in an opposite direction, either by positive means or by reason of vibration, the side 22 will move in the direction of the arrow 25, Fig. 1, which will cause the sharpened edge 23 to be pressed into the threads owing to the hardness of the metallic locking element as compared with that of the threads of the bolt, so that the said nut will be prevented from further movement and thus be held positively in locking engagement.

In Fig. 4 the locking element instead of having a straight edge as at 23 in Fig. 3 is provided with a serrated edge 26, the teeth of which are adapted to enter the threads of the bolt, otherwise the said locking element acts in substantially the same manner as that already described.

It will be seen that the locking element may be readily and positively released so that the nut may be removed from the bolt at any time it is desired to do so by simply driving a pin or like instrument as shown in dotted lines at 27 Fig. 5, which will force the side 22 of the locking element away from the threads thus permitting the nut to be rotated without the gripping edge engaging the threads of the bolt.

Fig. 5 shows a construction substantially the same as that described in the other figures except that only one locking element is provided and only one opening therefor, though it will be understood that the number of locking elements may be varied as desired.

From the foregoing it will be seen that a simple and efficient nut-lock is provided in which the nut is positively held against movement in one direction and which permits the nut to readily rotate on the bolt to clamp parts together, that said device is simple in construction and may be readily made and assembled; and that said nut-lock may be manufactured at a cost which at best would be only slightly in excess of what it costs to manufacture the ordinary nut.

Having thus described my invention, I claim as new and desire to secure by Letters Patent:—

A nut lock comprising a nut provided with a slot opening at both ends of its bore and on the interior of the same, said slot having a flat base and sides which converge therefrom toward the bore, and a bolt engaging element seated in the slot and having a portion fitting snugly upon the base of the slot, said bolt engaging element also having a resilient portion projecting from the base at an oblique angle to engage the threads of a bolt for the purpose specified, and said resilient portion standing away from the adjacent side of the slot, whereby means may be introduced through the open outer end of the slot behind the resilient portion for releasing the same to permit the nut to be screwed off.

This specification signed and witnessed this 20th day of June A. D. 1911.

JEAN HENRI RIVIÈRE.

Witnesses:
C. BARTELS,
LESTER C. TAYLOR.

Copies of this patent may be obtained for five cents each, by addressing the "Commissioner of Patents, Washington, D. C."